(12) United States Patent
Wagle et al.

(10) Patent No.: US 12,116,526 B1
(45) Date of Patent: Oct. 15, 2024

(54) METHODS AND COMPOSITIONS FOR CARBON DIOXIDE-FOAMED LOST CIRCULATION MATERIALS

(71) Applicant: SAUDI ARABIAN OIL COMPANY, Dhahran (SA)

(72) Inventors: Vikrant Wagle, Dhahran (SA); Jothibasu Ramasamy, Dhahran (SA); Ali Alsafran, Dhahran (SA); Abdulla Al-Awadh, Dammam (SA); Abdullah S. Al-Yami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/189,899

(22) Filed: Mar. 24, 2023

(51) Int. Cl.
| | |
|---|---|
| *E21B 21/00* | (2006.01) |
| *C09K 8/035* | (2006.01) |
| *C09K 8/508* | (2006.01) |
| *C09K 8/518* | (2006.01) |

(52) U.S. Cl.
CPC .............. *C09K 8/518* (2013.01); *C09K 8/035* (2013.01); *C09K 8/5083* (2013.01); *E21B 21/003* (2013.01)

(58) Field of Classification Search
None
See application file for complete search history.

(56) References Cited

U.S. PATENT DOCUMENTS

| | | |
|---|---|---|
| 4,072,194 A | 2/1978 | Cole et al. |
| 5,875,845 A | 3/1999 | Chatterji et al. |
| 6,221,934 B1 * | 4/2001 | Stark ...................... C08L 63/00 523/420 |
| 6,802,375 B2 | 10/2004 | Bosma et al. |
| 8,235,116 B1 | 8/2012 | Burts, Jr. et al. |
| 9,550,933 B2 | 1/2017 | Chatterji et al. |
| 9,784,079 B2 | 10/2017 | Salla et al. |
| 10,280,122 B2 | 5/2019 | Salla et al. |
| 10,287,480 B1 | 5/2019 | Reddy |
| 10,344,200 B2 | 7/2019 | Salla et al. |
| 10,450,495 B2 | 10/2019 | Reddy |
| 10,526,524 B2 | 1/2020 | Reddy |
| 11,370,956 B2 | 6/2022 | Alanqari et al. |
| 2002/0048676 A1 * | 4/2002 | McDaniel ................ B32B 5/16 428/407 |

(Continued)

FOREIGN PATENT DOCUMENTS

| | | |
|---|---|---|
| EP | 2167604 A1 | 3/2010 |
| EP | 3743399 A1 | 12/2020 |

*Primary Examiner* — Andrew Sue-Ako
(74) *Attorney, Agent, or Firm* — Vorys, Sater, Seymour and Pease LLP

(57) ABSTRACT

Methods and compositions including introducing a lost circulation material to a zone of interest in a subterranean formation via a wellbore, the zone of interest comprising depleted zones, zones of low pressure, lost circulation zones, fractured zones, and any combination thereof; wherein the lost circulation material comprises an epoxidized linear α-olefin; a surfactant; a curing agent; and a carbon dioxide gas-generating compound comprising sodium bicarbonate; heating the lost circulation material; and allowing the epoxidized linear α-olefin to polymerize to a resin and the carbon dioxide gas-generating compound to produce a gas to form a foamed resin in the zone of interest, thereby mitigating a flow of fluids from the wellbore into the subterranean formation.

11 Claims, 1 Drawing Sheet

(56) References Cited

U.S. PATENT DOCUMENTS

| | | | |
|---|---|---|---|
| 2007/0287640 A1* | 12/2007 | Ballard | C09K 8/36 |
| | | | 507/117 |
| 2008/0119656 A1* | 5/2008 | Rivers | C09K 8/52 |
| | | | 548/215 |
| 2022/0056233 A1 | 2/2022 | Wagle et al. | |
| 2022/0325165 A1* | 10/2022 | Wagle | E21B 21/003 |
| 2023/0203363 A1* | 6/2023 | Wagle | E21B 33/138 |
| | | | 166/305.1 |

* cited by examiner

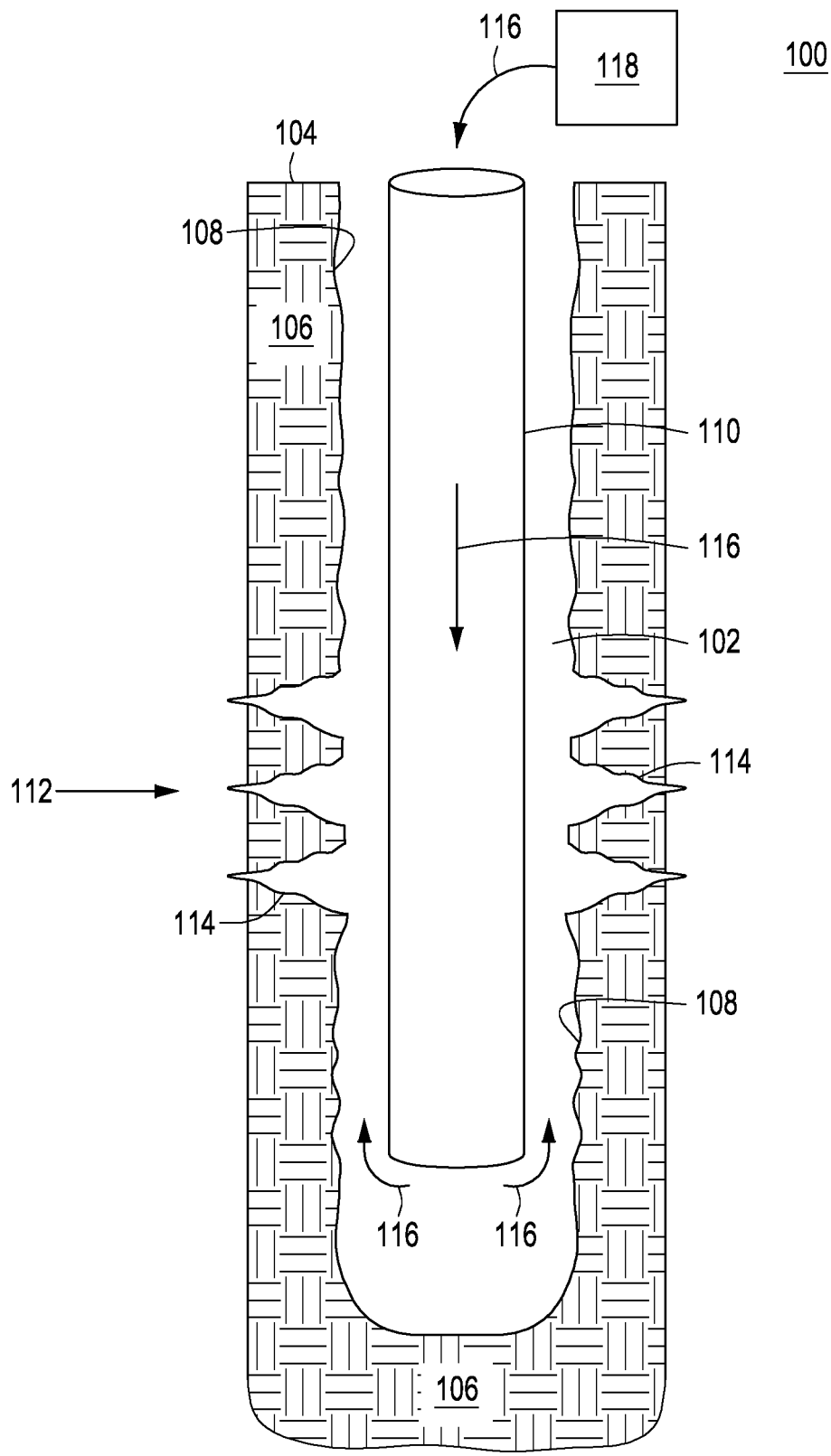

METHODS AND COMPOSITIONS FOR CARBON DIOXIDE-FOAMED LOST CIRCULATION MATERIALS

FIELD OF THE DISCLOSURE

The present disclosure relates generally to lost circulation materials and related methods.

BACKGROUND OF THE DISCLOSURE

Lost circulation can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various subterranean formation types, such as naturally fractured formations, cavernous formations, and highly permeable formations (e.g., formations having a permeability greater than 500 millidarcy). Lost circulation can be categorized by the amount of fluid or mud lost as seepage type, moderate type, severe type, and total loss. The extent of the fluid loss and the ability to control the lost circulation with a lost circulation material depends on the type of formation in which the lost circulation occurs.

One method that has been developed to control lost circulation involves the placement of lost circulation materials into a lost circulation zone (i.e., the sections of a formation into which drilling fluid may be lost). Conventional lost circulation materials may include fibrous, lamellated or granular materials. The lost circulation materials may be placed into the formation, inter alia, as part of a drilling fluid or as a separate lost circulation pill in an attempt to control and/or prevent lost circulation. For a number of reasons, use of lost circulation materials may not provide a desirable level of lost circulation control in all circumstances.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method is provided including introducing a lost circulation material to a zone of interest in a subterranean formation via a wellbore, the zone of interest comprising depleted zones, zones of low pressure, lost circulation zones, fractured zones, and any combination thereof; wherein the lost circulation material comprises an epoxidized linear α-olefin; a surfactant; a curing agent; and a carbon dioxide gas-generating compound comprising sodium bicarbonate; heating the lost circulation material; and allowing the epoxidized linear α-olefin to polymerize to a resin and the carbon dioxide gas-generating compound to produce a gas to form a foamed resin in the zone of interest, thereby mitigating a flow of fluids from the wellbore into the subterranean formation.

In another embodiment consistent with the present disclosure, a lost circulation material is provided including an epoxidized linear α-olefin; a surfactant; a curing agent; and a carbon dioxide gas-generating compound comprising sodium bicarbonate.

In a further embodiment consistent with the present disclosure, a method is provided including combining an epoxidized linear α-olefin, a surfactant, a curing agent, and a carbon dioxide gas-generating compound to form a lost circulation material, the carbon dioxide gas-generating compound comprising sodium bicarbonate; and heating the lost circulation material; and allowing the epoxidized linear α-olefin to polymerize to a resin and the carbon dioxide gas-generating compound to produce a gas to form a foamed resin.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWING

The FIGURE is a schematic diagram of a well site that may employ the lost circulation materials, according to various embodiments of the present disclosure.

DETAILED DESCRIPTION

Embodiments of the present disclosure will now be described in detail with reference to the accompanying FIGURE. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying FIGURE may vary without departing from the scope of the present disclosure.

Embodiments in accordance with the present disclosure generally relate to lost circulation materials and related methods. More specifically, the lost circulation materials of the present disclosure comprise an epoxidized linear α-olefin, a surfactant, a curing agent, and a carbon dioxide gas-generating compound. The lost circulation material, when introduced into a zone of interest in a subterranean formation and heated, may form a resin by the polymerization of the epoxidized linear α-olefin with the curing agent that is subsequently foamed by the gas produced by the carbon dioxide gas-generating compound. The foaming of the resin may occur in the zone of interest thereby mitigating (reducing) a flow of fluids from the wellbore into the subterranean formation.

The linear α-olefin may have a carbon number of 10 or higher. For example, the carbon number may be from 10 to 30 (or 10 to 20, or 20 to 30), encompassing any value and subset therebetween.

The epoxidized linear α-olefin may be formed by any suitable linear α-olefin epoxidation reaction. Examples of suitable linear α-olefin epoxidation reaction schemes include, but are not limited to, a reaction of a linear α-olefin with hypochlorous acid, a reaction of a linear α-olefin with a peracid, a reaction of a linear α-olefin with t-butylhydroperoxide and a molybdenum catalyst, the like, and any combination thereof.

The epoxidized linear α-olefin may have a concentration in the lost circulation material of about 60 percent by weight (wt %) to about 90 wt % (or about 60 wt % to about 80 wt %, or about 60 wt % to about 70 wt %, or about 70 wt % to about 90 wt %, or about 70 wt % to about 80 wt %, or about 80 wt % to about 90 wt %), encompassing any value and subset therebetween.

One or more surfactants in the lost circulation material may act as a foaming agent for the lost circulation material and may include anionic surfactants, cationic surfactants, nonionic surfactants, zwitterionic surfactants, or any combination thereof. Specific examples of surfactants include, but are not limited to, cocoamidopropyl hydroxysultaine, sodium dodecyl sulfate, sodium dodecylbenzenesulfonate, cetyltrimethylammonium bromide, the like, and any combination thereof.

The surfactant may have a concentration in the lost circulation material of about 1 wt % to about 10 wt % (or about 1 wt % to about 7.5 wt %, or about 1 wt % to about 5 wt %, or about 1 wt % to about 2.5 wt %, or about 2.5 wt % to about 10 wt %, or about 2.5 wt % to about 7.5 wt %, or about 2.5 wt % to about 5 wt %, or about 5 wt % to about 10 wt %, or about 5 wt % to about 7.5 wt %, or about 7.5 wt % to about 10 wt %), encompassing any value and subset therebetween.

The presence of the curing agent may initiate the polymerization of the epoxidized linear α-olefin to form a resin. Examples of suitable curing agents include, but are not limited to, a polymercaptan, a polyamide, an amidoamine, an aliphatic amine, a cycloaliphatic amine, an aromatic amine, a phenalkamine, the like, and any combination thereof.

The curing agent may have a concentration in the lost circulation material of about 1 wt % to about 20 wt % (or about 1 wt % to about 15 wt %, or about 1 wt % to about 10 wt %, or about 1 wt % to about 5 wt %, or about 5 wt % to about 20 wt %, or about 5 wt % to about 15 wt %, or about 5 wt % to about 10 wt %, or about 10 wt % to about 20 wt %, or about 10 wt % to about 15 wt %, or about 15 wt % to about 20 wt %), encompassing any value and subset therebetween.

The thermal decomposition of the carbon dioxide gas-generating agent may result in the production of carbon dioxide gas, which may foam the resin formed by the epoxidized linear α-olefin and the curing agent. The carbon dioxide gas-generating compound may include, but is not limited to, sodium bicarbonate.

The carbon dioxide gas-generating compound may have a concentration in the lost circulation material of about 1 wt % to about 20 wt % (or about 1 wt % to about 15 wt %, or about 1 wt % to about 10 wt %, or about 1 wt % to about 5 wt %, or about 5 wt % to about 20 wt %, or about 5 wt % to about 15 wt %, or about 5 wt % to about 10 wt %, or about 10 wt % to about 20 wt %, or about 10 wt % to about 15 wt %, or about 15 wt % to about 20 wt %), encompassing any value and subset therebetween.

The lost circulation material of the present disclosure may be used in wellbore fluids, such as drilling fluids.

A drilling fluid may include a base fluid and the lost circulation material of the present disclosure.

The lost circulation material of the present disclosure may be included in a drilling fluid in an amount in the range of about 30 percent volume by volume (% v/v) to about 90% v/v, encompassing any value and subset therebetween, such as preferably about 50% v/v to about 70% v/v, encompassing any value and subset therebetween.

The base fluid of the drilling fluid may be an oleaginous fluid or an aqueous-based fluid.

The oleaginous fluid may be any suitable fluid, such as oil or a solution containing both oil and one or more organic or inorganic compounds dissolved in the oil or otherwise completely miscible with the oil. The oleaginous fluid may include at least one naturally-derived or synthetically-derived oil. The oleaginous fluid may include oils derived from petroleum, such as mineral oils; diesel oils; linear or branched olefins; polyolefins; alkanes; paraffins; esters of fatty acids; straight chain, branched or cyclical alky ethers of fatty acids; other petroleum-derived oils; the like; and any combination thereof. The oleaginous fluid may contain esters, ethers, acetals, dialkylcarbonates, hydrocarbons, or combinations of any of these. The oleaginous fluid may also include oils derived from animals or plants, for example. The oleaginous fluid may also include other oils, such as, but not limited to, poly diorganosiloxanes, siloxanes, organosiloxanes, other silicone-based oils, the like, and any combination thereof.

An aqueous-based fluid may be any suitable fluid, such as water or a solution containing both water and one or more organic or inorganic compounds dissolved in the water or otherwise completely miscible with the water. Examples of water sources may include, but are not limited to, freshwater, well water, filtered water, distilled water, seawater, salt water, produced water, formation brine, the like, and any combination thereof. For example, the aqueous fluid may contain brine, including natural and synthetic brine. The aqueous fluid may include water containing water-soluble organic compounds, such as alcohols, organic acids, amines, aldehydes, ketones, esters, or other polar organic compounds, or salts dissolved in the water. In some embodiments, the aqueous fluid may include salts, water-soluble organic compounds, or both, as impurities dissolved in the water. Further, the aqueous fluid may include salts, water-soluble organic compounds, or both, to modify at least one property of the aqueous fluid, such as density or ionic concentration. Increasing the amount of salt, water-soluble organic compounds, or both, may increase the density of the drilling fluid. Examples of salts that may be present in the aqueous fluid may include, but are not limited to, metal salts, such as sodium salts, calcium salts, cesium salts, zinc salts, aluminum salts, magnesium salts, potassium salts, strontium salts, silicates, lithium salts, the like, and any combination thereof. The metal salts may be in the form of chlorides, bromides, carbonates, hydroxides, iodides, chlorates, bromates, formates, nitrates, sulfates, phosphates, oxides, fluorides, the like, and any combination thereof.

The drilling fluid may further include other components, which may include, but are not limited to, wetting agents, organophilic clays, viscosifiers, surfactants, dispersants, interfacial tension reducers or emulsifying agents, rheological modifies, pH buffers, mutual solvents, thinners, thinning agents, weighting agents, cleaning agents, the like, and any combination thereof.

The drilling fluids comprising a base fluid, the lost circulation material of the present disclosure, and optionally other components may be used in a drilling operation. For example, during a drilling operation, a drilling fluid is continuously pumped into a wellbore penetrating a subterranean formation to clear and clean the wellbore and the filings (also referred to as cuttings) resulting from drilling. The drilling fluid is typically pumped from a mud pit into the wellbore and returns again to the surface. An indication that a depleted zone, zone of low pressure, lost circulation zone, or fractured zone has been encountered is when the flow rate of the drilling fluid that returns to the surface is less than the flow rate of the drilling fluid pumped into the wellbore. This reduction or absence of returning drilling fluid is referred to as lost circulation.

Drilling fluids comprising the lost circulation material of the present disclosure may be used for drilling all or portions of the wellbore. For example, the lost circulation material of the present disclosure may be added to the drilling fluid when a depleted zone, a zone of low pressure, a lost circulation zone, or a fractured zone is encountered. Fractured zones may include fractures that are natural or induced, vugular or cavernous, highly permeable, or unconsolidated. Alternatively, the lost circulation material of the present disclosure may be included in the drilling fluid regardless of encountering a depleted zone, a zone of low pressure, a lost circulation zone, or a fractured zone.

The drilling fluid, when introduced into the wellbore, will enter a zone of interest, wherein the zone of interest, for example, may be a depleted zone, a zone of low pressure, a lost circulation zone, a fracture zone, or any combination thereof. The curing agent in the lost circulation material will initiate the polymerization of the epoxidized linear α-olefin to form a resin. As heat is applied to the zone of interest due to natural downhole temperatures, the temperature of the lost circulation material will increase causing the carbon dioxide gas-generating compound to produce a gas that foams the resin in the zone of interest. The heat applied to the zone of interest may additionally be from an external heat source such as a downhole heater (e.g., an immersion heater or a circulation heater).

The FIGURE illustrates a non-limiting example of a well site 100 having a wellbore 102 through the Earth's surface 104 into a subterranean formation 106 in the Earth's crust. To form the wellbore 102, a hole (i.e., a borehole) is drilled into the subterranean formation 106 to generate a drilled formation surface 108 as an interface for the wellbore 102 with the subterranean formation 106. The formation surface 108 may be characterized as the wellbore 102 wall. The wellbore 102 may have openhole portions but generally includes a cylindrical casing 110, as shown in the FIGURE. The wellbore 102 in the depicted implementation of the FIGURE is a cased wellbore 102. In the illustrated non-limiting example, the wellbore 102 has a lost circulation zone 112 caused by lost circulation features 114 of the subterranean formation 106 at that portion of the wellbore 102. The lost circulation features 114 along the wellbore 102 at the lost circulation zone 112 cause or contribute to the lost circulation. The lost circulation features 114 are structural features or characteristics of the subterranean formation 106 at or near the wellbore 102. The features 114 may include, but are not limited to, fractures, voids, vugulars (i.e., vugs), gaps, permeable channels, cavities, cavernous openings, the like, and any combination thereof.

In a drilling operation, a fluid (e.g., drilling fluid or drilling mud) is introduced from the surface 104 by flowing downward through the casing 110 and drill string (not shown), is discharged from the drill bit (not shown) at the bottom of the wellbore 102, and flows upward through the annulus between the subterranean formation 106 and the casing 110 toward the surface 104 as a return fluid. Some or all of the fluid flowing upward through the annulus may be lost through the features 114 into the subterranean formation 106 at the lost circulation zone 112 in the wellbore 102.

The lost circulation materials of the present application may be utilized to treat the lost circulation zone 112 to mitigate a flow of fluids from the wellbore into the subterranean formation. A drilling fluid 116 comprising the lost circulation materials of the present application may be introduced (e.g., pumped) into the wellbore 102. The drilling fluid 116 may be may be pumped by at least one pump (e.g., a mud pump) of the surface equipment 118 at the surface 104. In certain implementations, the at least one pump may be associated with a drilling rig. The at least one pump may be skid-mounted in some instances. The at least one pump may include a centrifugal pump, a positive displacement pump, a reciprocating positive displacement pump (e.g., a piston pump or a plunger pump), or any combination thereof. The surface equipment 118 may include equipment (e.g., vessels, solid-handling equipment, piping, or additional pumps) to incorporate the lost circulation materials, solids (e.g., filler material, bridging material, other lost circulation material products), the like, and any combination thereof into the drilling fluid 116. The solids would be in addition to the lost circulation materials of the present disclosure. The surface equipment 118 may include equipment to support other operations at the well site 100.

The lost circulation material may be similarly introduced into the zone of interest in the form of a drilling pill, in which an amount of drilling fluid containing the lost circulation fluid is injected into the wellbore specifically as a lost circulation curing procedure. In general, a drilling pill may be a relatively small quantity or volume of drilling fluid as a specialized blend utilized for a particular purpose in treating the wellbore 102 or subterranean formation 106.

Once the lost circulation material enters the lost circulation features 114 via the drilling fluid 116, the lost circulation materials may be heated to a temperature suitable for the decomposition of the carbon dioxide gas-generating compound. For example, the lost circulation material may be heated to a temperature of about 100° F. to about 200° F. (or about 100° F. to about 175° F., or about 100° F. to about 150° F., or about 100° F. to about 125° F., or about 125° F. to about 200° F., or about 125° F. to about 175° F., or about 125° F. to about 150° F., or about 150° F. to about 200° F., or about 150° F. to about 175° F., or about 175° F. to about 200° F.), encompassing any value and subset therebetween. The decomposition of the carbon dioxide gas-generating compound may cause a release of carbon dioxide gas, thus foaming the polymerized resin formed from the lost circulation materials.

The formation of the foamed resin in the zone of interest (e.g., the lost circulation features 114 of the FIGURE) may mitigate a flow of fluids, such as drilling fluid, from the wellbore into the subterranean formation. In some embodiments, the quality of the foamed resins may range from about 5% to about 95% gas volume, encompassing any value and subset therebetween. Most preferably, the foamed treatment fluid may have a foam quality from about 85% to about 95%, or about 90% to about 95%, encompassing any value and subset therebetween.

Mitigation of the flow of fluids may be referred to herein as a "fluidic seal," in which a barrier is formed to the flow of fluids (e.g., drilling fluids or other fluid types). A fluidic seal may form a barrier having a permeability of less than about 0.1 darcies, including complete sealing such that no fluid passes through the fluidic seal. Optionally, the lost circulation material may include a component (or additive), as described herein for the breakdown and removal of at least a portion of the fluidic seal. As used herein, the term "at least a portion," with reference to the breakdown and removal of the fluidic seal, and grammatical variants thereof, refers to restoring the zone of interest (e.g., lost circulation features of 114 of the FIGURE) in which the fluidic seal was formed to a permeability no less than about 75% of the original permeability of the target zone.

It is to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the well site 100 depicted generally in the FIGURE.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as concentration, temperatures, and so forth used in the present specification and associated claims are to be understood as being modified in all instances by the term "about." As used herein, the term "about" encompasses +/− 5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

Terms of orientation are used herein merely for purposes of convention and referencing and are not to be construed as limiting. However, it is recognized these terms could be used with reference to an operator or user.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Embodiments disclosed herein include:

Embodiment A: A method comprising: introducing a lost circulation material to a zone of interest in a subterranean formation via a wellbore, the zone of interest comprising depleted zones, zones of low pressure, lost circulation zones, fractured zones, and any combination thereof; wherein the lost circulation material comprises an epoxidized linear α-olefin; a surfactant; a curing agent; and a carbon dioxide gas-generating compound comprising sodium bicarbonate; heating the lost circulation material; and allowing the epoxidized linear α-olefin to polymerize to a resin and the carbon dioxide gas-generating compound to produce a gas to form a foamed resin in the zone of interest, thereby mitigating a flow of fluids from the wellbore into the subterranean formation.

Embodiment B: A lost circulation material comprising: an epoxidized linear α-olefin; a surfactant; a curing agent; and a carbon dioxide gas-generating compound comprising sodium bicarbonate.

Embodiment C: A method comprising: combining an epoxidized linear α-olefin, a surfactant, a curing agent, and a carbon dioxide gas-generating compound to form a lost circulation material, the carbon dioxide gas-generating compound comprising sodium bicarbonate; and heating the lost circulation material; and allowing the epoxidized linear α-olefin to polymerize to a resin and the carbon dioxide gas-generating compound to produce a gas to form a foamed resin.

Each of embodiments A, B, and C may have one or more of the following additional elements in any combination:

Element 1: wherein the lost circulation material is a component of a drilling fluid.

Element 2: wherein the lost circulation material is a component of a drilling pill.

Element 3: wherein the epoxidized linear α-olefin has a carbon number of 10 or higher.

Element 4: wherein the curing agent comprises a polymercaptan, a polyamide, an amidoamine, an aliphatic amine, a cycloaliphatic amine, an aromatic amine, a phenalkamine, and any combination thereof.

Element 5: wherein the epoxidized linear α-olefin is formed by a reaction of a linear α-olefin with hypochlorous acid, a reaction of a linear α-olefin with a peracid, a reaction of a linear α-olefin with t-butylhydroperoxide and a molybdenum catalyst, and any combination thereof.

Element 6: wherein the epoxidized linear α-olefin has a concentration of about 60 wt % to about 90 wt %, based on total mass of the lost circulation material.

Element 7: wherein the surfactant has a concentration of about 1 wt % to about 10 wt %, based on total mass of the lost circulation material.

Element 8: wherein the curing agent has a concentration of about 1 wt % to about 20 wt %, based on total mass of the lost circulation material.

Element 9: wherein the carbon dioxide gas-generating compound has a concentration of about 1 wt % to about 20 wt %, based on total mass of the lost circulation material.

Element 10: wherein the lost circulation material is heated in the zone of interest to a temperature of about 100° F. to about 200° F.

By way of non-limiting example, exemplary combinations applicable to A, B and C include any one, more, or all of Elements 1-10 in any combination.

Example

A mixture of an epoxidized linear α-olefin with a carbon number of 10 (VIKOLOX 10™, 15 g), a cocoamidopropyl hydroxysultain-based surfactant (PETROSTEP SB™, 0.5 g) and a carbon dioxide gas-generating compound (sodium bicarbonate, 1 g) was stirred for two minutes at 150° F. using a glass rod. A diethylene triamine curing agent (RAZEEN-CURE 931™, 2.25 g) was added to the mixture and stirred for another two minutes to form a resin and incubated at 150° F. A similar control resin was also prepared containing the same components without the surfactant and carbon dioxide gas-generating compound. After 30 minutes, the experimental resin containing the surfactant and carbon dioxide gas-generating compound showed an increase in volume of about 150% while the volume of the control resin was unchanged, indicating that the experimental resin had expanded due to the presence of the carbon dioxide gas-generating compound and surfactant.

The invention claimed is:

1. A method comprising:
   introducing a drilling fluid to a zone of interest in a subterranean formation via a wellbore;
      wherein a lost circulation material is a component of the drilling fluid;
      wherein the drilling fluid comprises a base fluid comprising an oleaginous fluid and wherein the drilling fluid does not comprise an organosiloxane;
   the zone of interest comprising at least one of depleted zones, zones of relatively low pressure, lost circulation zones, and fractured zones;
   wherein the lost circulation material comprises
      an epoxidized linear α-olefin;
      a surfactant;
      a curing agent; and
      a carbon dioxide gas-generating compound comprising sodium bicarbonate;
   heating the lost circulation material; and
   allowing the epoxidized linear α-olefin to polymerize to a resin and the carbon dioxide gas-generating compound to produce a gas to form a foamed resin in the zone of interest, thereby mitigating a flow of fluids from the wellbore into the subterranean formation.

2. The method of claim 1, wherein the lost circulation material is a component of a drilling pill.

3. The method of claim 1, wherein the epoxidized linear α-olefin has a carbon number from 10 to 30.

4. The method of claim 1, wherein the curing agent comprises at least one of a polymercaptan, a polyamide, an amidoamine, an aliphatic amine, a cycloaliphatic amine, an aromatic amine, and a phenalkamine.

5. The method of claim 1, wherein the epoxidized linear α-olefin is formed by at least one of a reaction of a linear α-olefin with hypochlorous acid, a reaction of a linear α-olefin with a peracid, and a reaction of a linear α-olefin with t-butylhydroperoxide and a molybdenum catalyst.

6. The method of claim 1, wherein the epoxidized linear α-olefin has a concentration of about 60 wt % to about 90 wt %, based on total mass of the lost circulation material.

7. The method of claim 1, wherein the surfactant has a concentration of about 1 wt % to about 10 wt %, based on total mass of the lost circulation material.

8. The method of claim 1, wherein the curing agent has a concentration of about 1 wt % to about 20 wt %, based on total mass of the lost circulation material.

9. The method of claim 1, wherein the carbon dioxide gas-generating compound has a concentration of about 1 wt % to about 20 wt %, based on total mass of the lost circulation material.

10. The method of claim 1, wherein the lost circulation material is heated in the zone of interest to a temperature of about 100° F. to about 200° F.

11. A method comprising:
   combining an epoxidized linear α-olefin, a surfactant, a curing agent, and a carbon dioxide gas-generating compound to form a lost circulation material, the carbon dioxide gas-generating compound comprising sodium bicarbonate; and
   including the lost circulation material in a drilling fluid, wherein the drilling fluid comprises a base fluid comprising an oleaginous fluid and wherein the drilling fluid does not comprise an organosiloxane;
   heating the lost circulation material; and
   allowing the epoxidized linear α-olefin to polymerize to a resin and the carbon dioxide gas-generating compound to produce a gas to form a foamed resin.

\* \* \* \* \*